United States Patent Office 2,942,693
Patented June 28, 1960

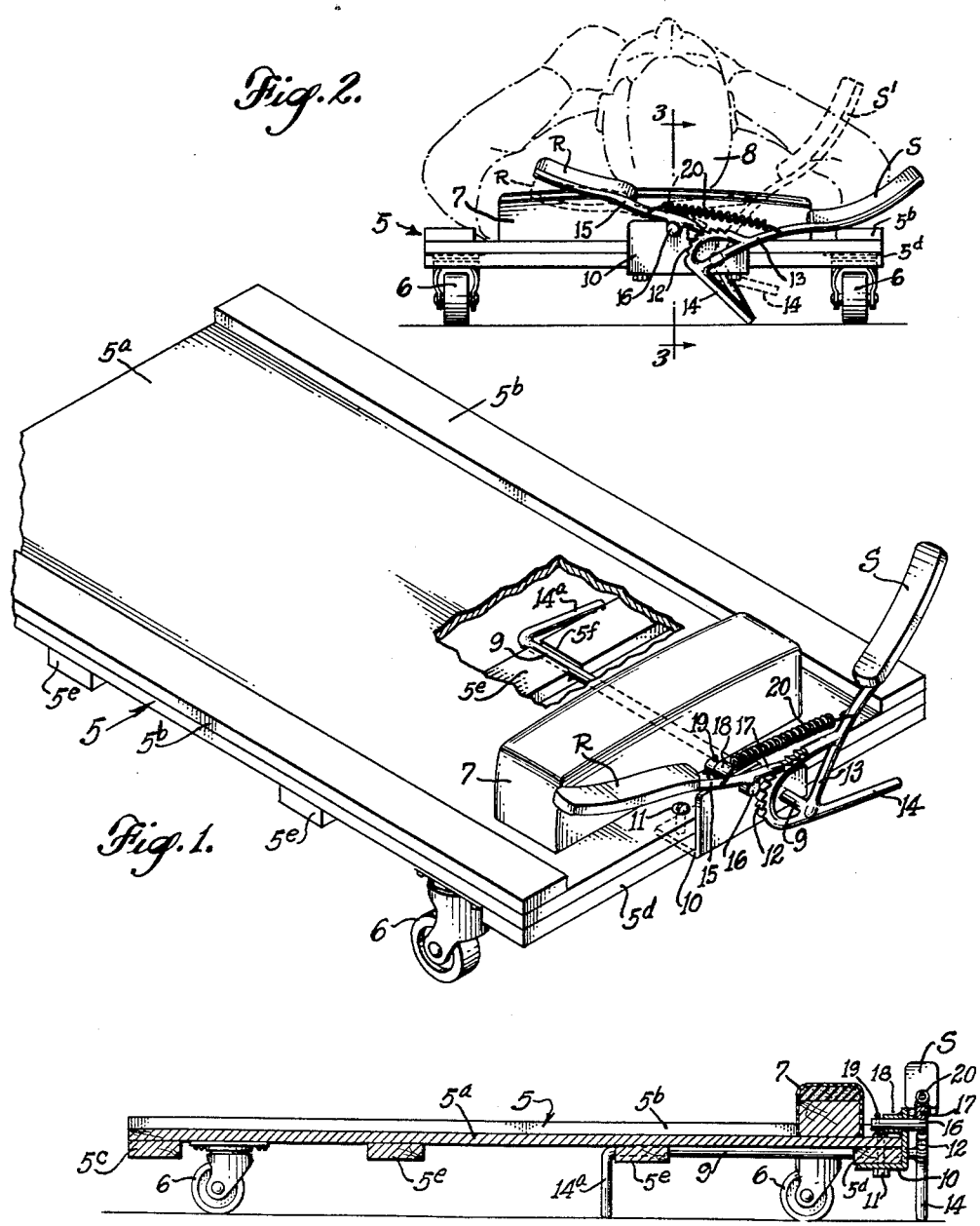

2,942,693
BRAKE MECHANISM FOR MECHANIC'S CREEPER
John Melvin Johnson, 417 S. 2nd St., Lindsborg, Kans.
Filed Oct. 20, 1958, Ser. No. 768,106
1 Claim. (Cl. 188—5)

It is common practice for mechanics in automotive vehicle repair shops to make use of a so-called "creeper" a movable platform consisting of a flat horizontal support mounted close to the ground on small rollers or wheels and adapted to support a mechanic while working beneath an automotive vehicle to dismount, repair or install the motor, its parts or mechanism.

This invention relates generally to new and useful improvements in automotive shop "creepers" and has particular reference to new and useful brake means for frictionally releasably anchoring a movable "creeper" to the floor in stationary stabilized position to prevent its unintentional movement while a mechanic supported thereon carries on his work underneath the vehicle.

It is therefore among the objects of my invention to provide a new and improved "stop-creep" brake device which is comparatively simple in construction, low in cost of manufacture and easily installed on so-called automotive shop "creepers."

It is also an important feature or object of my invention to provide a brake device of the character above described that is easily operable by the movement of the mechanic's head to one side into position to press down upon a lever adapted to set the brake into holding position; the brake device being easily released to quickly permit maneuverability of the support by a movement of the mechanic's head to the opposite side into position to engage and press down upon the brake release lever.

The facility for controlling the "creeper" to set or release its brake device simply by the movement of the mechanic's head permits free use of both of his hands at all times; the desirability of this facility to prevent shifting of the "creeper" while both hands are employed and to permit shifting of the "creeper" at will, is obvious.

The various features of novelty whereby the present invention is characterized will hereinafter be pointed out with particularity in the claim, but, for a full understanding of the invention and of its objects and advantages, reference may be had to the following detailed description taken in connection with the accompanying drawing wherein:

Fig. 1 is a perspective view of an automotive mechanic's movable support for use in working beneath an automobile vehicle and embodying my invention;

Fig. 2 is an end elevation of the improved support; and

Fig. 3 is a longitudinal section taken on line 3—3 of Fig. 2.

In the drawing, the mechanic's movable support, commonly known also by mechanics as a "creeper," is designated by numeral 5 and, as shown, consists of a low, flat, horizontal platform 5ª reinforced by longitudinal side members 5ᵇ, end cross members 5ᶜ and 5ᵈ, and transverse members 5ᵉ; the support being movable on suitable freely rotatable casters 6.

The support 5 carries on its top surface, near one end, a suitable padded head rest 7 which is so located that it is conveniently adapted to be engaged by the back of the neck of the user-mechanic while lying on the support and while his head 8 is conveniently positioned to exert downward pressure selectively upon the brake-actuating lever S or upon the brake-releasing lever R.

The brake mechanism includes the brake shaft 9 which is oscillatable in groove 5ᶠ which is cut into transverse member 5ᵉ and which serves as a bearing for shaft 9; the outer end of the shaft being oscillatably supported in a like groove in cross member 5ᵈ and in angle iron support 10 that is suitably secured to cross member 5ᵈ as by bolts or screws 11.

Shaft 9 extends through angle iron 10 into operative connection with a toothed segmental rack 12 which is integrally formed with the lever 13 which extends outwardly and carries at its free end the brake-actuating lever S. Extending within the vertical plane of the lever arm 13 is brake leg 14 which conveniently may be integrally formed as a part of the segmental rack 12, as shown, or which brake leg 14 may be integrally formed with the end of shaft 9 adjacent the segmental rack 12. To enhance the frictional braking facility, the shaft 9 may also be provided with a brake leg 14ª formed integrally with the inner end of shaft 9.

The brake mechanism also includes a lever 15 that functions alternately as a brake-holding lever and as a brake-releasing lever and that is pivotally mounted on a short shaft 16 and formed with an integral dog 17 at its inner end that is adapted to engage the toothed rack 12.

The short shaft 16 extends through the support 10 and is carried in the short sleeve bearing 18 which is confined between the inner face of the upstanding leg of the angle iron support 10 and the cotter pin 19 extending through the shaft 16 at its inner end.

The lever 15 carries at its outer free end the brake holding and releasing arm R.

The brake-actuating levers S and R are connected by a coil spring 20 whose opposite ends are secured respectively to levers 13 and 15. The spring 20 serves a dual purpose, that of activating lever R for engaging dog 17 with the toothed rack 12 and providing the necessary reversible force to lever S for releasing the braking action of brake legs 14.

It will now readily be understood that a mechanic, lying on the support 5 with the back of his neck resting on the headrest 7 and his head positioned in the vertical plane of levers S and R, may conveniently engage and depress the lever S with his head and thus move same from the brake-released position S¹, shown in broken lines in Fig. 2, to the position S shown in full lines in Fig. 2 and thereby cause a rotation of shaft 9 and swinging movement of brake legs 14 and 14ª into frictional engagement with the floor to thereby frictionally retain the support 5 in stationary position to permit the mechanic to carry on his work beneath the vehicle freely with both hands; while thus swinging the brake legs into braking positions shaft 9 causes a rotation of the segmental toothed rack 12 into braking position while dog 17, responsive to the pull of spring 20 is resiliently retained in engagement with rack 12 to prevent its reverse rotation into brake-released position.

To release the brake legs 14, 14ª from frictional engagement with the floor, all that the mechanic needs to do is to move his head into engagement with the release lever R and with his head press down on the lever R to cause the dog 17 to be swung upwardly out of engagement with rack 12 to thereby permit the force of spring 20 to move the lever 13 upwardly, into the position shown by the broken lines in Fig. 2, with both brake legs 14, 14ª raised from frictional contact with the floor.

While I have shown and described a preferred embodiment of my novel movable support, it will be understood that various changes and improvements may be made in

I claim:

A movable platform mounted close to the floor on freely rotatable casters and adapted to support a mechanic thereon while engaged in work underneath an automotive vehicle, said platform carrying a brake mechanism including a shaft, a pair of brake legs operatively connected with said shaft adapted to be moved into frictional engagement with the floor to thereby retain said platform in stationary position, a toothed rack operatively connected with said shaft, a brake-actuating lever connected with said shaft adapted to move said shaft and said brake legs into braking position, a pivotally mounted brake releasing lever, a dog operatively associated with said brake-releasing lever normally engaging said toothed rack to thereby prevent unintentional movement of said rack to release said brake legs from frictional engagement with the floor, a coil spring having opposite ends thereof connected to respectively said brake-actuating lever and said brake-releasing lever, said coil spring functioning to yieldingly retain said dog in engagement with said toothed rack and to provide the necessary force to move said brake-actuating lever into position to release said brake legs from frictional engagement with the floor to permit free movement of the platform on its supporting casters, said brake-actuating lever and said brake-release lever being adapted to be alternately actuable by pressure thereon exerted by the machanic's head while supported on the platform and engaged in work underneath the automotive vehicle.

References Cited in the file of this patent

UNITED STATES PATENTS

| | | |
|---|---|---|
| 1,219,889 | Weed | Mar. 20, 1917 |
| 1,611,891 | Cossoff | Dec. 28, 1926 |
| 2,689,744 | Mullin | Sept. 21, 1954 |
| 2,780,472 | Weldon | Feb. 5, 1957 |